A. A. BRITT.
PACKLESS VALVE FOR PRESSURE OR VACUUM SYSTEMS.
APPLICATION FILED MAY 12, 1913.
1,090,269.
Patented Mar. 17, 1914.
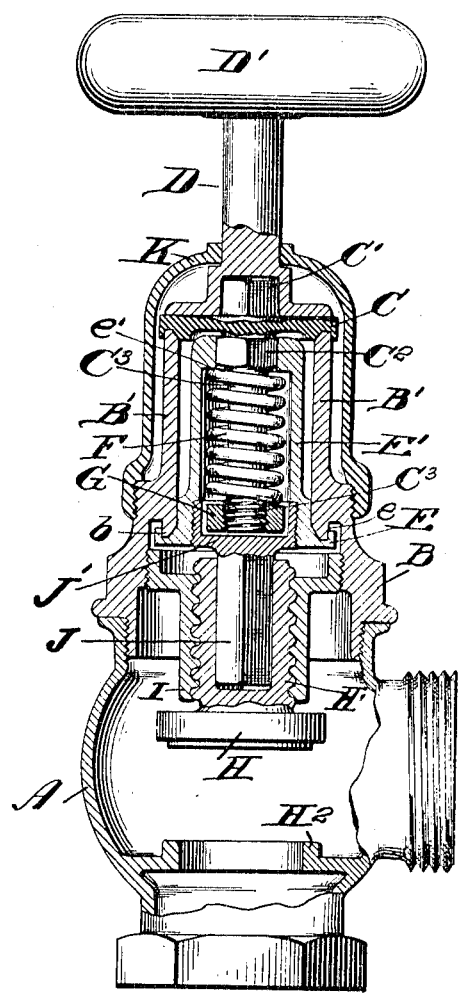
WITNESSES:
Grace E. Wynkoop.
M. E. Broesamle
INVENTOR
Alfred A. Britt
BY
J. E. Thomas
ATTORNEY

UNITED STATES PATENT OFFICE.

ALFRED A. BRITT, OF DETROIT, MICHIGAN.

PACKLESS VALVE FOR PRESSURE OR VACUUM SYSTEMS.

1,090,269. Specification of Letters Patent. Patented Mar. 17, 1914.

Application filed May 12, 1913. Serial No. 767,022.

*To all whom it may concern:*

Be it known that I, ALFRED A. BRITT, citizen of the United States, residing at Detroit, county of Wayne, State of Michigan, have invented a certain new and useful Improvement in Packless Valves for Pressure or Vacuum Systems, and declare the following to be a full, clear, and exact description of the same, such as will enable others skilled in the art to which it pertains to make and use the same, reference being had to the accompanying drawings, which form a part of this specification.

My invention relates to an improvement in valves for use on pressure or vacuum systems, shown in the accompanying drawings and more particularly set forth in the following specification and claims.

The object of my invention is to provide an efficient packless valve which may be installed on either a vacuum or pressure system.

Other features of the invention will hereafter appear.

The drawing is a vertical sectional view through the valve, with certain parts in elevation and others broken away to more clearly disclose the coöperation of the several parts.

Referring to the letters of reference placed upon the drawing: A denotes the body of the valve; B the bonnet having a screw-threaded engagement with the valve body.

B' indicates an upstanding annular sleeve integral with the valve bonnet.

C is a disk having an annular groove on its underface to receive the upper edge of the sleeve B' upon which the disk is seated. Integral with the disk C is an upstanding squared stem or lug C' lodged within a squared socket formed in the lower end of the stem D of the operating handle D'.

E indicates a disk having an annular channel $e$ on its upper face to receive the depending lower edge $b$ of the annular sleeve against which it is seated. The disk E is provided with an upstanding collar E', having a squared opening at its upper end to receive the depending squared portion $C^2$ of the stem $C^3$, integral with the upper disk C.

F denotes a coiled spring encircling the stem housed within the collar E'; its upper end bearing against the shoulder $e'$, formed by the end wall of the collar, its lower end bearing against an adjustable nut G having a screw-threaded engagement with the stem $C^3$,—by adjusting this nut the tension of the spring may be regulated.

H is a valve from which rises an annular shank H' having a screw-threaded engagement with an interiorly threaded depending member I, in turn supported by a screw-threaded engagement with the valve bonnet.

J is a squared stem, provided with an annular or cup-shaped top J', having a screw-threaded engagement with the disk E. The squared stem J, entering a similarly shaped socket formed in the screw-threaded shank H' of the valve thus operably connects the parts together.

$H^2$ is the seat for the valve H.

K is a closure cap having a screw-threaded engagement with the valve bonnet and provided with an opening at the top through which the stem D of the operating handle projects.

Having indicated the several parts by reference letters, the construction and operation of the device will be readily understood.

In assembling the parts the nut G is adjusted so that the tension of the spring will draw the disks C and E tightly against their respective seats at opposite ends of the sleeve B'. To actuate the valve H, the handle D' is operated in the usual way, the squared socket at the lower end of the stem D serving to actuate the squared lug C' integral with the disk C, thereby rotating the disk and with it the depending stem $C^3$,—the squared portion $C^2$ of which is housed within a squared aperture in the end wall of the collar E' rising from the disk E. Thus the disk E is rotated, and it being provided with a downwardly projecting squared stem J lodged in the squared socket of the shank of the valve H, in turn having a screw-threaded engagement with the fixed depending member I, the valve may be either raised, or seated at $H^2$ as required, by actuating the operating handle.

It will be obvious that when the valve is employed upon a pressure system, the pressure of steam or the like, bearing upon the disk E, will force it to its seat and thus coöperate to effectually seal the valve against leakage around the stem. When used on a vacuum system, the vacuum will have a tendency to draw the disk C to its seat at the upper end of the sleeve B', thereby co-operating also to secure the system against leakage at the valve stem.

Having thus described my invention, what I claim is:—

1. In a device of the class described, a body portion provided with a valve seat, an annular sleeve supported upon the body portion, a jointed valve stem, a valve controlling the passage through the body portion actuated by the jointed valve stem, said valve stem comprising a pair of disks spaced apart and respectively seated at opposite ends of the sleeve, a spring located between the disks to draw them to their respective seats, and means for regulating the tension of the spring.

2. In a device of the class described, a body portion provided with a valve seat, an annular sleeve supported upon the body portion, a jointed valve stem, a valve controlling the passage through the body portion actuated by the jointed valve stem, said valve stem comprising a pair of disks spaced apart and respectively carried by sections of the jointed valve stem, said disks respectively seated at opposite ends of the sleeve, a spring located between the disks to draw them to their seats, and means to regulate the tension of the spring.

3. In a device of the class described, a body portion provided with a valve seat, a valve, a bonnet engaged to the body portion and having an annular sleeve integral therewith, a valve stem formed in sections and jointed together and adapted to actuate said valve, said valve stem comprising a pair of disks respectively carried by sections of the valve stem and respectively seated at opposite ends of the sleeve, a spring located between the disks to draw them to their seats, and means for regulating the tension of the spring.

4. In a device of the class described, a body portion provided with a valve seat, a valve having a screw-threaded shank provided with a squared socket, a bonnet engaged to the body portion, a depending member to receive and support the screw-threaded shank of the valve, an annular sleeve carried by the bonnet, a disk seated against one end of the sleeve, said disk provided with an annular collar portion, a stem engaged to said disk squared to conform to the socket of the valve shank in which it is housed, a disk seated on the opposite end of the sleeve and provided with a stem projecting into the annular collar portion of the first named disk, one portion of said stem being squared to enter a like shaped opening in the end wall of the collar portion, a spring housed within the collar portion, a nut engaging said depending stem adapted to regulate the tension of the spring whereby the disks are drawn to their respective seats, one of said disks provided with a projecting lug squared in cross-section, an operating handle, a stem carried by the handle having a squared socket to receive the projecting lug of the last named disk, and a closure cap engaged to the bonnet having an opening through which the stem of the operating handle projects.

In testimony whereof, I sign this specification in the presence of two witnesses.

ALFRED A. BRITT.

Witnesses:
SAMUEL E. THOMAS,
WILLIAM E. ARNDT.